(12) United States Patent
Kim et al.

(10) Patent No.: US 8,508,431 B2
(45) Date of Patent: Aug. 13, 2013

(54) EXPANDABLE MULTI-MODULE DISPLAY APPARATUS

(75) Inventors: Seong Gyun Kim, Gyeonggi-do (KR); Nam Yong Kong, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 709 days.

(21) Appl. No.: 12/216,680

(22) Filed: Jul. 9, 2008

(65) Prior Publication Data

US 2009/0015513 A1    Jan. 15, 2009

(30) Foreign Application Priority Data

Jul. 10, 2007   (KR) .................. 10-2007-0069182

(51) Int. Cl.
*G09G 5/00* (2006.01)
(52) U.S. Cl.
USPC .............. 345/1.3; 345/1.1; 345/1.2; 348/383; 382/173; 382/174
(58) Field of Classification Search
USPC ................... 345/1.3, 1.1–1.2; 382/173, 174; 348/383
See application file for complete search history.

(56) References Cited

U.S. PATENT DOCUMENTS

| | | | | |
|---|---|---|---|---|
| 5,828,410 A | * | 10/1998 | Drapeau | 348/383 |
| 5,923,307 A | * | 7/1999 | Hogle, IV | 345/4 |
| 5,956,000 A | * | 9/1999 | Kreitman et al. | 345/1.3 |
| 6,759,997 B2 | * | 7/2004 | Someya et al. | 345/1.1 |
| 2001/0006375 A1 | * | 7/2001 | Tomooka et al. | 345/4 |
| 2002/0180719 A1 | * | 12/2002 | Nagai et al. | 345/206 |
| 2004/0113865 A1 | | 6/2004 | Oku et al. | |
| 2006/0001593 A1 | * | 1/2006 | Baudisch | 345/1.1 |
| 2007/0121012 A1 | * | 5/2007 | Hida et al. | 348/589 |
| 2007/0146378 A1 | * | 6/2007 | Sorgard et al. | 345/581 |
| 2007/0285342 A1 | * | 12/2007 | Morikawa et al. | 345/1.3 |

OTHER PUBLICATIONS

Office Action issued in counterpart Korean Patent Application No. 2007-0069182 dated May 2, 2013.

* cited by examiner

*Primary Examiner* — Lun-Yi Lao
*Assistant Examiner* — Priyank Shah
(74) *Attorney, Agent, or Firm* — Morgan, Lewis & Bockius LLP

(57) ABSTRACT

An expandable multi-module display device cuts block data corresponding to an identification code of the expandable multi-module display device itself, and transmits the data-cut result to a specific flat panel display corresponding to the expandable multi-module display device itself, such that it displays a total image. The expandable multi-module display device includes a multi-panel including a plurality of flat panel displays, several multi-driving boards installed in the flat panel displays, respectively, and a data bus line connected to each of the multi-driving boards. The expandable multi-module display device cuts data corresponding to an identification code of the multi-module display device itself, and provides a specific flat panel display with the cut data corresponding to the multi-driving board itself, and bypasses the remaining data other than the cut data to the multi-driving boards of the remaining flat panel displays other than the specific flat panel display.

5 Claims, 10 Drawing Sheets

EXPANDABLE MULTI-MODULE DISPLAY APPARATUS

This application claims the benefit of Korean Patent Application No. 10-2007-0069182, filed on Jul. 10, 2007, which is hereby incorporated by reference as if fully set forth herein.

BACKGROUND OF THE INVENTION

1. Field of the Invention

The present invention relates to an expandable multi-module display device, and more particularly to an expandable multi-module display device which cuts data corresponding to an identification code of the multi-module display device itself, and provides a specific flat panel display with the cut data corresponding to the multi-module display device itself, and bypasses the remaining data other than the cut data to the multi-driving boards of the remaining flat panel displays other than the specific flat panel display.

2. Discussion of the Related Art

A flat panel display (FPD) is an image display device thinner than a computer monitor such as a cathode-ray tube (CRT). There are a variety of flat panel displays, for example, a liquid crystal display (LCD), a plasma display panel (PDP), and an organic light emitting diode (OLED), etc. FIG. 1 shows an example of a screen image of an expandable multi-module display according to the related art. Some flat panel displays are connected to each other as shown in FIG. 1, a large-sized screen or a multi-screen is configured to display an image, such that the displayed image is used for advertisement or movies.

In a conventional expandable multi-module display, some flat panel displays are connected to each other, such that an image displayed on a single panel is configured in the form of a total image. In order to receive a multiple-image source appropriate for each screen, the conventional expandable multi-module display requires an image display system appropriate for the number of screens.

Therefore, when the image display system appropriate for the number of screens is installed, the system cost unavoidably increases, and a complicated network is required to extend the system. The conventional expandable multi-module display device may have unnecessary functions as compared to the other display device composed of only panels, and has difficulty in the slim-sized implementation.

SUMMARY OF THE INVENTION

Accordingly, the present invention is directed to an expandable multi-module display device that substantially obviates one or more problems due to limitations and disadvantages of the related art.

An object of the present invention is to provide an expandable multi-module display device which cuts block data corresponding to an identification code of the expandable multi-module display device itself, and transmits the data-cut result to a specific flat panel display corresponding to the expandable multi-module display device itself, such that it displays a total image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an expandable multi-module display device comprising: a multi-panel including a plurality of flat panel displays; several multi-driving boards installed in the flat panel displays, respectively; and a data bus line connected to each of the multi-driving boards, in which the multi-driving board cuts data corresponding to an identification code of the multi-driving board, and provides a specific flat panel display with the cut data corresponding to the multi-driving board itself, and bypasses the remaining data other than the cut data to the multi-driving boards of the remaining flat panel displays other than the specific flat panel display.

Preferably, the expandable multi-module display device further comprises a control signal generator for transmitting a split-screen control signal designating several blocks, which have been divided according to the individual flat panel displays, to each of the multi-driving boards.

Preferably, the multi-driving board receives the split-screen control signal designating the divided blocks appropriate for the individual flat panel displays from the control signal generator, and cuts block data corresponding to an identification code of the multi-driving board itself.

Preferably, the multi-driving board performs scaling of a cut part of the block data corresponding to the identification code of the multi-driving board itself according to a resolution of the flat panel display.

Preferably, the multi-driving board converts a cut part of the block data corresponding to the identification code of the multi-driving board itself into a frame frequency of the flat panel display.

Therefore, the above-mentioned expandable multi-module display device cuts block data corresponding to an identification code of the multi-module display device itself, and transmits the data-cut result to a specific flat panel display corresponding to the multi-module display device itself, such that it displays a total image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Preferred embodiments of the present invention will hereinafter be described with reference to FIGS. 2~11.

Figure 2:
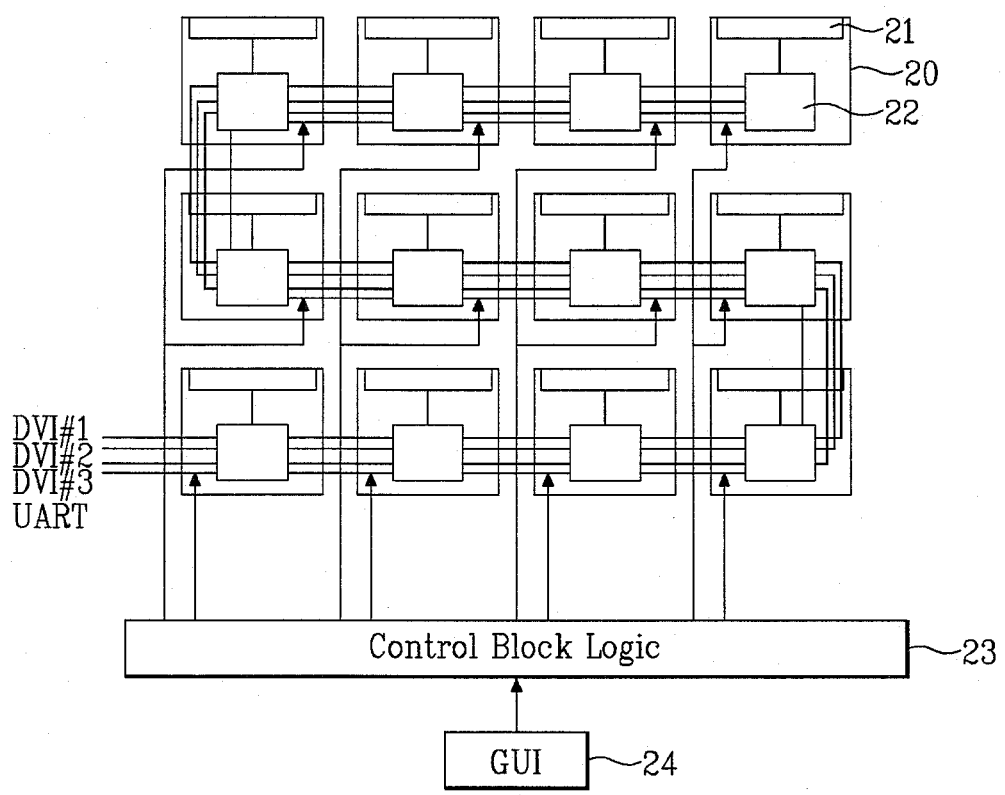
FIG. 2 is a circuit diagram illustrating a multi-driving board according to the present invention.

FIG. 2 is a rear view of an LCD panel according to the present invention. In more detail, FIG. 2 is a circuit diagram illustrating a multi-driving board according to the present invention.

Referring to FIG. 2, the expandable multi-module display includes a multi-driving board 22 contained in a flat panel display (FPD) 20, a control block logic unit 23 for controlling the multi-driving board 22, and a graphic user interface (GUI) for providing the control block logic unit 23 with graphic signals.

Figure 1:
FIG. 1 shows an example of a screen image of an expandable multi-module display according to the related art.

The multi-driving board 22 receives moving images or PC-formatted data. The multi-driving board 22 is integrated on the flat panel display 20 as one body, and includes a network for driving the multi-module display. In this multi-driving board 22, input video lines (DVI #1, DVI #2, and DVI #3) for providing image signals and a control signal line (UART) for providing an image control signal are connected in series to the multi-driving board 22 of each LCD panel 20. In this case, one of image signals is a PC image, and the remaining image signals are TV or DVD signals received from a moving-image player. The multi-driving board 22 receives at least one moving image data as shown in FIG. 1. The multi-driving borad 22 receives the control signal from the control block logic unit 23 via a control signal line, such that it confirms block information of each flat panel display.

Figure 3:
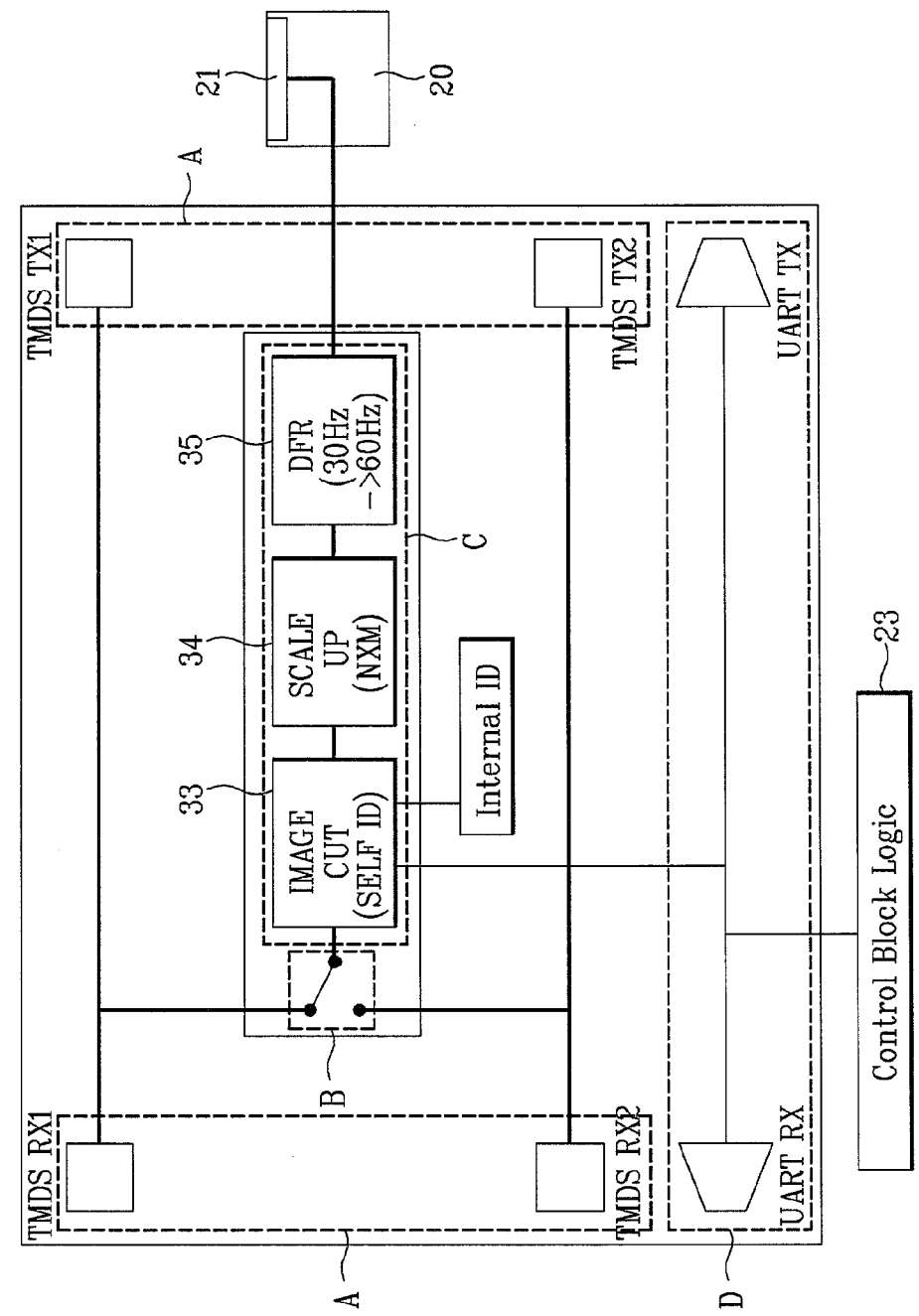
FIG. 3 is a detailed circuit diagram illustrating a multi-driving board according to the present invention.
Figure 4:
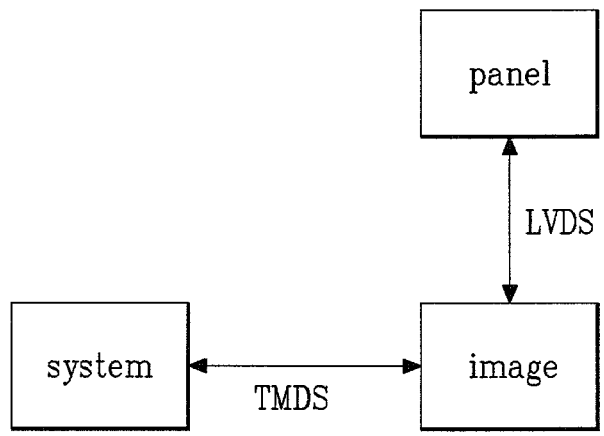
FIG. 4 is a block diagram illustrating an interface according to the present invention.
Figure 5:
FIG. 5 is a screen image illustrating an identification code of an expandable multi-module display panel according to the present invention.

FIG. 3 is a detailed circuit diagram illustrating a multi-driving board according to the present invention.

Referring to FIG. 3, the multi-driving board 22 includes an image transmission unit A, a switching unit B, a driver C, and a control transmission unit D. The image transmission unit A receives an input image signal, and transmits the received image signal to the next panel without any change. The switching unit B switches the PC signals or external moving image signals. The driver C controls the driving of the multi-driving board 22. The control transmission unit D transmits the control signal to the next panel.

The image transmission unit A receives PC image signals or external moving-image signals, and transmits the received signals to the next panel. The image transmission unit A transmits the PC image signals or external moving-image signals to the next panel without any modulation for the received signals. In this case, a transition minimized differential signaling (TMDS) of the image transmission unit A serves as an interface for connecting the system to the image signal, and is used to transmit digital data.

The switching unit B switches the PC signals or the external moving-image signals. In other words, if the switch of the switching unit B is switched to an upper contact point shown in FIG. 3, the switching unit B receives image data from an upper image transmission unit A. Otherwise, if the switch of the switching unit B is switched to a lower contact point shown in FIG. 3, the switching unit B receives image data from a lower upper image transmission unit A. The video data received from the switching unit B is applied to the driver C.

The driver C displays individual images of the individual panels constructing a total image. If the PC image signals or external moving images received from the image transmission unit A are switched by the switching unit B the switched signals are supplied to the driver C. This driver C includes: a division unit 33 for identifying an identification code (ID) of each panel and performs the image cutting; a scale unit 34 for controlling the image size; and a double frame rate (DFR) unit 35 for controlling an image frequency.

The division unit 33 receives the PC image signals or external moving-image signals from the image transmission unit A, and cuts the received signals into a plurality of images of each panel. The division unit 33 corresponds to its identification code using block information of each panel according to the control signal of the control block logic unit 23, because the control block unit 23 has total screen size information and each panel block information. For example, the division unit 23 divides the size of a total screen image into 4 panel blocks upon receiving the control signal from the control block logic unit 23, allows the 4 panel blocks to have unique identification codes $o_1 \sim o_4$, such that the image cutting process of the corresponding panel block images is performed.

The scale unit 34 scales the cut image received from the division unit 33 according to the panel resolution. For example, provided that the N×M multi-module display is driven by the panel having the resolution of I×J, the cut image of each panel block acquired from the division unit 33 is inappropriate for each panel resolution, such that a desired image is not able to be displayed. In order to solve the above-mentioned problem, the scale unit 34 scales the resolution for the image of the (I×J)-sized panel according to the resolution of each panel.

The DFR unit 35 changes a frequency provided to a screen of each frame into another frequency. In more detail, if the image signal is determined to be a PC image signal, the DFR unit 35 transmits the frequency of 30 Hz to a screen of each frame. This 30 Hz frequency per frame allows a user to view some flickers on the screen, resulting in a deterioration of an image quality. In order to solve this problem, the DFR unit 35 changes the frequency into another frequency (for example, 60 60 Hz frequency signal), transmits the 60 Hz frequency signal to the screen of each frame, and prevents the occurrence of flickers, such that it displays a desired image. This changed frequency is provided to the timing controller 21.

The control transmission unit D performs two functions (i.e., first and second functions). According to the first function A, the control transmission unit D controls the switching function of the switching unit A. According to the second function B, the control transmission unit D receives the control signal having block information of each panel from the control block logic unit 23, controls the division unit 33, and transmits the resultant control signal to other panels.

The control block logic unit 23 has the total-screen size information and information for each panel block. This control block logic unit 23 is controlled by the graphic user interface 24. The control signal from the control block logic unit 23 controls the division unit 33 such that the division unit 33 is able to divide the panel block corresponding to the identification code of the panel block, and the division unit 33 is able to perform the cutting of data provided to the panel block.

The graphic user interface (GUI) 24 controls the control block logic unit 23. In other words, the graphic user interface (GUI) 24 controls the control block logic unit 23, such that the control signal is transmitted in series to all panels via the control transmission unit D. The graphic user interface (GUI) provides graphic data or digital video data.

Figure 7:
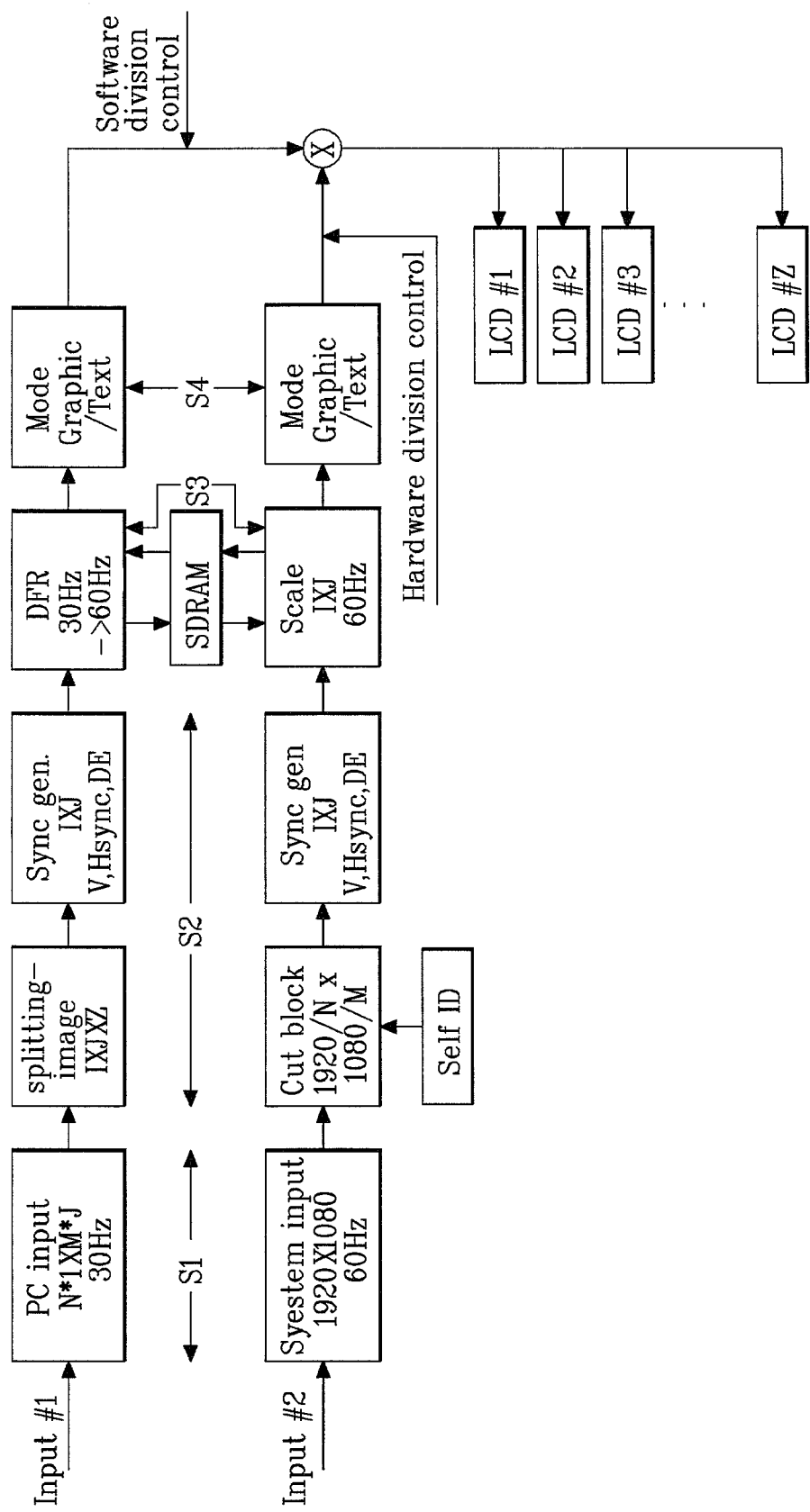
FIG. 7 is a flow chart illustrating a method for driving an expandable multi-module display according to the present invention.

FIG. 7 is a flow chart illustrating a method for driving an expandable multi-module display according to the present invention.

Figure 6:
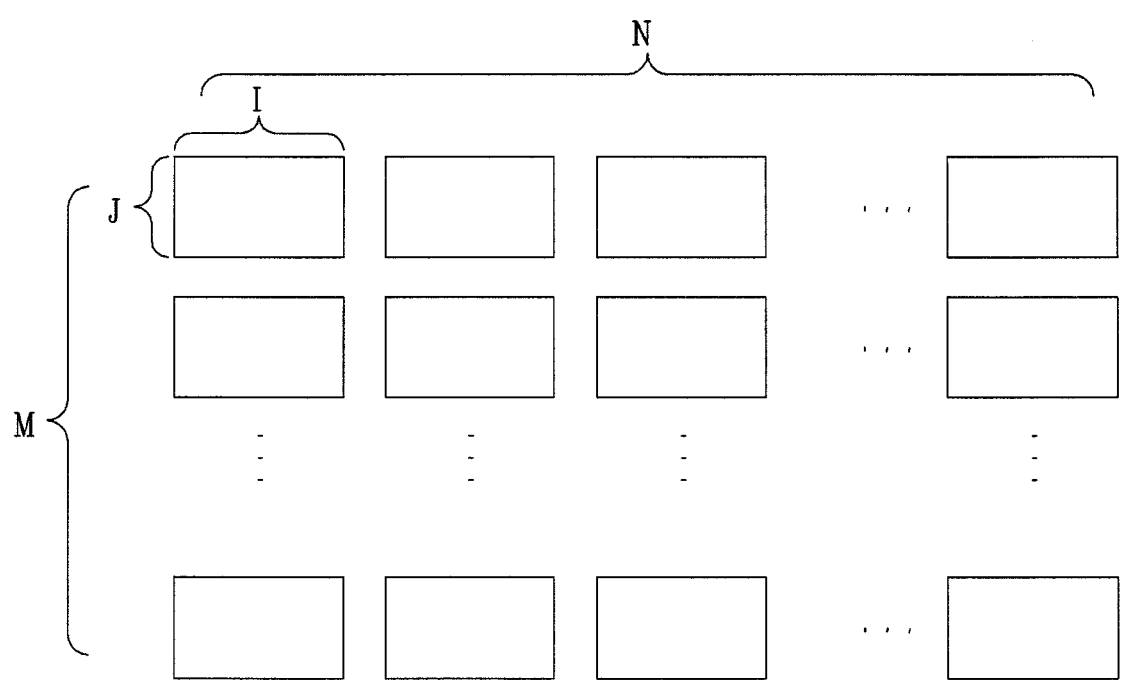
FIG. 6 is a schematic diagram illustrating (N×M) expandable multi-module display according to the present invention.
Figure 8:
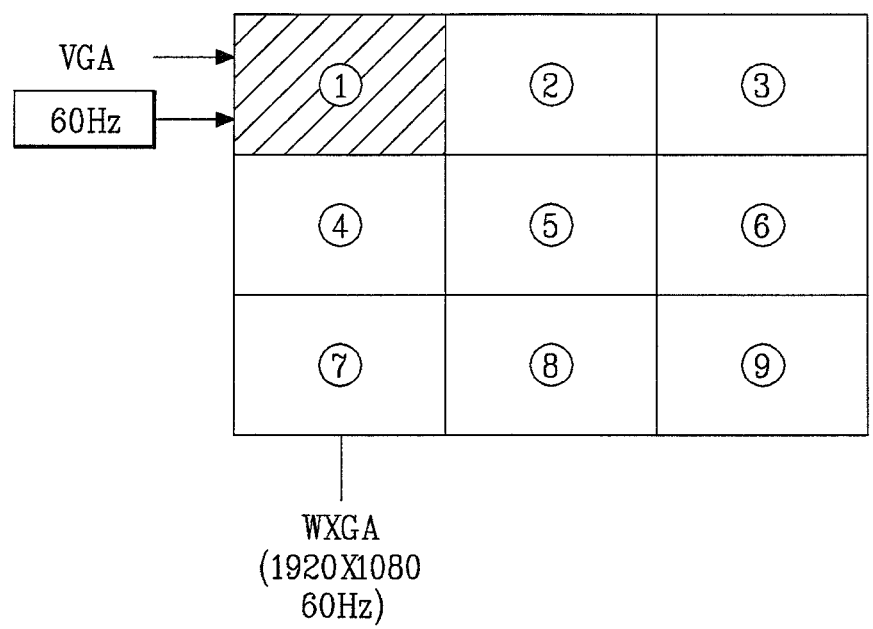
FIG. 8 is a conceptual diagram illustrating that an external moving image is applied to an expandable multi-module display according to the present invention.

Referring to FIG. 7, the multi-driving board 22 receives the PC image signal from the first input signal, and receives the external moving image signals (i.e., system signals) from the second input line at step S1. In this case, if the PC image signal is decided, the input image of the frequency of 30 Hz is provided to all panels (N*I×M*J), as shown in FIG. 6. If the external moving image signal is decided, the input image of the frequency of 60 Hz is provided to a Wide Extended Graphics Array (WXGA) panel of (1920×1080), as shown in FIG. 8.

After performing the above step S1, the division unit 33 identify the identification code of each panel-block and, cut the PC image signal or external moving image signal of each panel. Thereafter, the scan signal is provided to each panel. At step S2, if the PC image signal is decided, a scan signal (Sync) corresponding to each panel (I×J) formed by the division of a total panel (I×J×Z(N×M)), as shown in FIG. 6. At step S2, if the external moving image signal is decided, identification codes $o_1$~$o_9$ of the individual panel blocks are distinguished from each other as shown in FIG. 8, such that the scan signals (i.e., Sync signals) corresponding to the individual panels $o_1$~$o_9$ are generated (S2).

After performing the above step S2, the PC image signal performs the software division control, such that the PC image is displayed on a total screen. This software division scheme need not perform the scaling process, and requires the image frequency conversion process by the DFR unit 35. In other words, the PC image signal is provided as the frequency of 30 Hz to an input line, and the DFR unit 35 change the frequency of 30 Hz into another frequency of 60 Hz. However, since the external moving image signal is provided as the frequency of 60 Hz to an input line, the frequency of the external moving image signal need not to be changed into another frequency by the DFR unit 35. But, the external moving image signal requires the scaling process based on the hardware division control (S3). If the external moving image signal is used, the division process of each panel block must be performed by the division unit 33 as shown in FIG. 8, and the scaling process appropriate for the resolution of each panel $o_1$~$o_9$ is also required. In the case of the absence of the above-mentioned division process and the scaling process, the desired image cannot be implemented, such that the scaling process is needed at step S3. In this case, a memory (SDRAM) is used as a storage unit required when the image frequency conversion is performed by the DFR unit 35 or the scaling process appropriate for each panel resolution is performed.

After performing the above step S3, the PC image signal or external moving-image signal is displayed on the screen according to a graphic-mode or text-mode shown in FIGS. 9 to 12. The expandable display is used to display a total screen using several panels. When graphic data is displayed on the screen, a bezel 92 is formed between panels, such that broken graphic data is displayed on the screen. In order to solve the above-mentioned problem, if a current mode is a graphic mode, the graphic data is represented by split images. If a current mode is a text mode, original graphic data is provided on the screen without any change.

Figure 9:
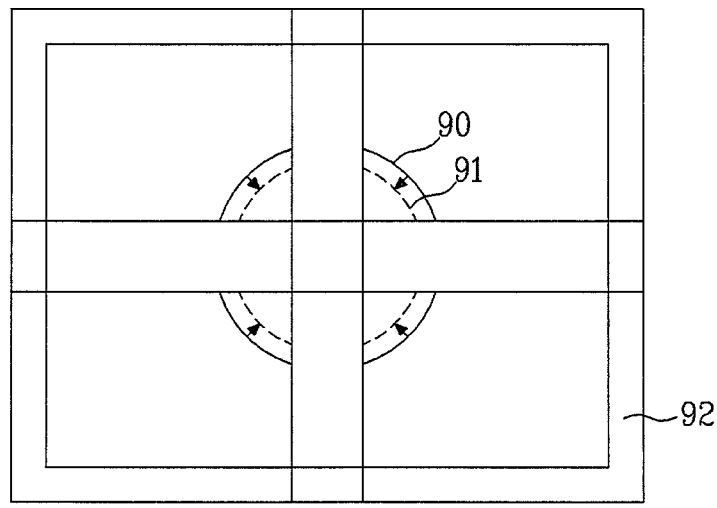
FIGS. 9~10 are conceptual diagrams illustrating that graphic data is displayed on an expandable multi-module display according to the present invention.
Figure 10:
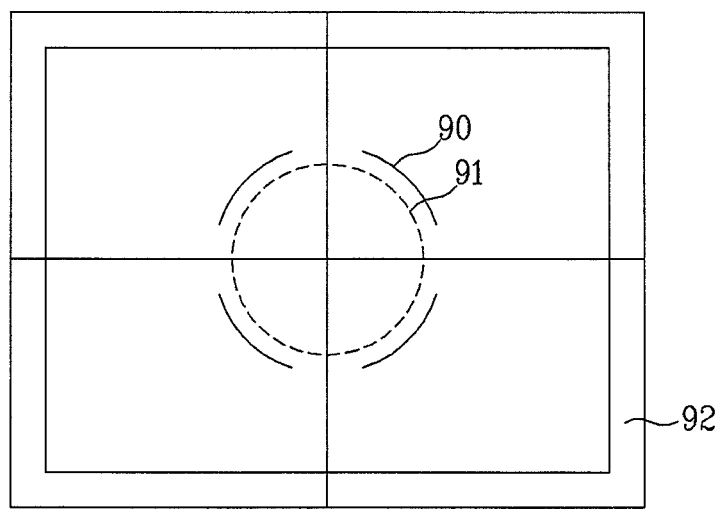
Figure 11:
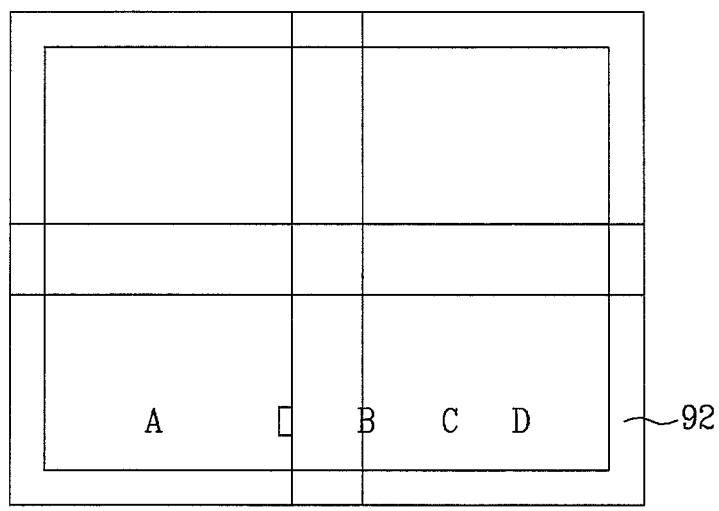
FIGS. 11~12 are conceptual diagrams illustrating that text data is displayed on an expandable multi-module display according to the present invention.
Figure 12:
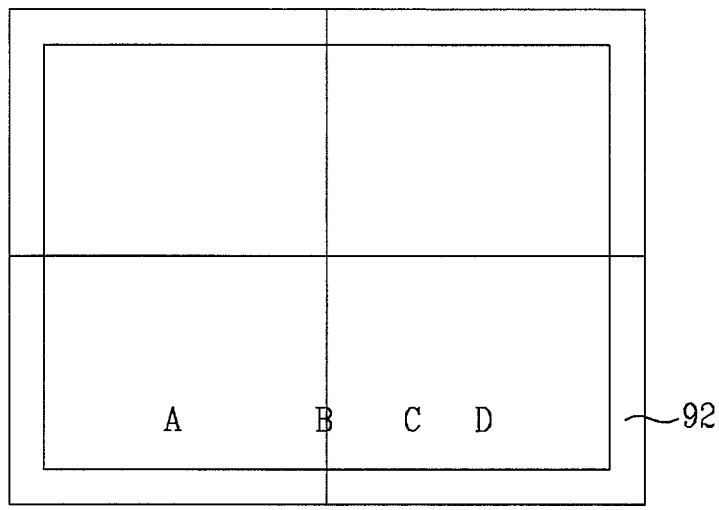

FIGS. 9~10 are conceptual diagrams illustrating that graphic data is displayed on an expandable multi-module display according to the present invention. FIGS. 11~12 are conceptual diagrams illustrating that text data is displayed on an expandable multi-module display according to the present invention. If the current mode is determined to be the graphic mode as shown in FIGS. 9 and 10, smaller-sized circular graphic data 91 smaller than the graphic data 90 displayed on each panel is displayed, such that the present invention prevents the circle from being broken on the screen as shown in FIG. 10. If the current mode is determined to be the text mode as shown in FIGS. 11 and 12, the desired text data can be displayed on the screen without any change at step S4.

As apparent from the above description, the expandable multi-module display according to the present invention includes a multi-driving board in each panel, cuts block data corresponding to an identification code of each multi-driving board according to a control signal of the control block logic unit, and provides the flat panel display with the resultant cut data. Also, the expandable multi-module display performs the scaling process or the frequency conversion process on the cut data, and displays the resultant image on the screen.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An expandable multi-module display device comprising:
    a multi-panel including a plurality of flat panel displays;
    a plurality of multi-driving boards installed in the flat panel displays, respectively; and
    a data bus line connected to each of the multi-driving boards, wherein the plurality of multi-driving boards are connected serially to each other by the data bus line, in which
    the multi-driving board cuts image data corresponding to an identification code of the multi-driving board, and provides a specific flat panel display with the cut image data corresponding to the multi-driving board itself, and bypasses the remaining image data other than the cut image data to the multi-driving boards of the remaining flat panel displays other than the specific flat panel display by using the data bus line;
    wherein the image data is displayed on the multi panel according to graphic mode or text mode;
    when a current mode is determined to be the graphic mode, smaller-sized image data smaller than the image data displayed on each flat panel is displayed on the multi panel;
    when the current mode is determined to be the text mode, the image data is displayed on the multi panel without any change; and
    the data bus line has a shape of zigzag.

2. The expandable multi-module display device according to claim 1, further comprising:
    a control signal generator for transmitting a split-screen control signal designating several blocks, which have been divided according to the individual flat panel displays, to each of the multi-driving boards.

3. The expandable multi-module display device according to claim 1 or 2, wherein the multi-driving board receives the split-screen control signal designating the divided blocks appropriate for the individual flat panel displays from the control signal generator, and cuts block data corresponding to an identification code of the multi-driving board itself.

4. The expandable multi-module display device according to claim 3, wherein the multi-driving board performs scaling of a cut part of the block data corresponding to the identification code of the multi-driving board itself according to a resolution of the flat panel display.

5. The expandable multi-module display device according to claim 3, wherein the multi-driving board converts a cut part of the block data corresponding to the identification code of the multi-driving board itself into a frame frequency of the flat panel display.

* * * * *